(12) United States Patent
Hattori et al.

(10) Patent No.: US 8,861,933 B2
(45) Date of Patent: Oct. 14, 2014

(54) INFORMATION PROCESSING APPARATUS, INFORMATION PROCESSING METHOD AND COMPUTER PROGRAM

(75) Inventors: Shinobu Hattori, Tokyo (JP); Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1758 days.

(21) Appl. No.: 12/156,910

(22) Filed: Jun. 5, 2008

(65) Prior Publication Data

US 2008/0310267 A1    Dec. 18, 2008

(30) Foreign Application Priority Data

Jun. 12, 2007  (JP) ................................. 2007-154750

(51) Int. Cl.
  *H04N 5/91* (2006.01)
  *G11B 27/34* (2006.01)
  *G11B 27/034* (2006.01)
  *G11B 27/11* (2006.01)

(52) U.S. Cl.
  CPC .............. *G11B 27/034* (2013.01); *G11B 27/34* (2013.01); *G11B 2220/2541* (2013.01); *G11B 2220/2516* (2013.01); *G11B 27/11* (2013.01); *G11B 2220/2562* (2013.01)
  USPC .......................................... 386/252; 386/248

(58) Field of Classification Search
  USPC ................. 709/201, 204, 208, 212, 220, 230; 707/600, 707, 708, 609, 821, 899; 386/200, 235, 339, 291, 326
  See application file for complete search history.

(56) References Cited

U.S. PATENT DOCUMENTS

| 5,530,939 A | 6/1996 | Mansfield et al. |
|---|---|---|
| 5,987,477 A | 11/1999 | Schmuck et al. |
| 5,991,399 A | 11/1999 | Graunke et al. |
| 6,389,538 B1 | 5/2002 | Gruse et al. |
| 6,609,128 B1 | 8/2003 | Underwood |

(Continued)

FOREIGN PATENT DOCUMENTS

| EP | 984346 A1 | 3/2000 |
|---|---|---|
| JP | 2002-522995 | 7/2002 |

(Continued)

OTHER PUBLICATIONS

Blu-Ray Disc Association: "White paper Blu-ray Disc Format. 2.B Audio Visual Application Format Specification for BD-ROM", XP007903517 Retrieved from the Internet: URL:http://www.blu-raydisc.com/assets/downloadablefile2b_bdrom_audiovisualapplication_0305-12955-13403.pdf, retrieved of Nov. 16, 2007.

*Primary Examiner* — Kambiz Zand
*Assistant Examiner* — Nega Woldemariam
(74) *Attorney, Agent, or Firm* — Wolf, Greenfield & Sacks, P.C.

(57) ABSTRACT

An information processing apparatus includes a storage section storing subsequent data subsequently acquired or generated as data corresponding to a medium stored content, a control section executing a management process of managing subsequent data with respect to the storage section, the control section being configured to execute, as the management process of the subsequent data, a process of generating and recording subsequent data descriptive information including medium identification information corresponding to subsequent data and title identification information at a time of executing a process of recording subsequent data in the storage section, a process of generating display data based on the subsequent data descriptive information, and a process of reproducing or deleting subsequent data based on user designation information for the display data based on the subsequent data descriptive information.

19 Claims, 13 Drawing Sheets

(56) References Cited

U.S. PATENT DOCUMENTS

| | | |
|---|---|---|
| 6,671,803 B1 | 12/2003 | Paieka |
| 7,225,333 B2 | 5/2007 | Peinado et al. |
| 7,362,862 B2 | 4/2008 | Schneier et al. |
| 2002/0118838 A1 | 8/2002 | Belenko et al. |
| 2003/0005301 A1 | 1/2003 | Jutzi et al. |
| 2003/0037068 A1 | 2/2003 | Thomas et al. |
| 2003/0093678 A1 | 5/2003 | Bowe et al. |
| 2003/0182316 A1 | 9/2003 | Johnson |
| 2003/0217011 A1 | 11/2003 | Peinado et al. |
| 2004/0034667 A1 | 2/2004 | Sauvage et al. |
| 2004/0049648 A1 | 3/2004 | Sato et al. |
| 2004/0143609 A1 | 7/2004 | Gardner et al. |
| 2004/0172533 A1 | 9/2004 | DeMello et al. |
| 2005/0015410 A1 | 1/2005 | Sato |
| 2005/0027757 A1 | 2/2005 | Kiessig et al. |
| 2005/0044227 A1 | 2/2005 | Haugh et al. |
| 2005/0091521 A1 | 4/2005 | Terada et al. |
| 2005/0132209 A1 | 6/2005 | Hug et al. |
| 2005/0149580 A1 | 7/2005 | Hattori et al. |
| 2005/0157002 A1 | 7/2005 | Silverbrook |
| 2005/0232589 A1* | 10/2005 | Kimura et al. ................. 386/69 |
| 2005/0246393 A1 | 11/2005 | Coates et al. |
| 2006/0064756 A1 | 3/2006 | Ebert |
| 2006/0077772 A1 | 4/2006 | Seo et al. |
| 2006/0153021 A1 | 7/2006 | Seo et al. |
| 2006/0155786 A1* | 7/2006 | Seo et al. ...................... 707/204 |
| 2006/0155790 A1 | 7/2006 | Jung et al. |
| 2006/0288424 A1 | 12/2006 | Saito |
| 2007/0116280 A1 | 5/2007 | Takashima |
| 2007/0136282 A1 | 6/2007 | Takashima |
| 2007/0172199 A1 | 7/2007 | Kobayashi et al. |
| 2007/0183740 A1* | 8/2007 | Ando et al. ..................... 386/46 |
| 2008/0235268 A1 | 9/2008 | Miyoshi et al. |
| 2008/0235356 A1 | 9/2008 | Miyoshi et al. |
| 2008/0259745 A1 | 10/2008 | Yasushi et al. |
| 2008/0310267 A1 | 12/2008 | Hattori et al. |
| 2009/0106261 A1 | 4/2009 | Nagasaka et al. |
| 2009/0119273 A1 | 5/2009 | Nagasaka et al. |
| 2009/0297128 A1 | 12/2009 | Nagasaka et al. |
| 2009/0299823 A1 | 12/2009 | Nagasaka et al. |
| 2009/0299981 A1 | 12/2009 | Nagasaka et al. |
| 2009/0300036 A1 | 12/2009 | Nagasaki |

FOREIGN PATENT DOCUMENTS

| | | |
|---|---|---|
| JP | 2002-244552 A | 8/2002 |
| JP | 2002-311967 A | 10/2002 |
| JP | 2002-311998 A | 10/2002 |
| JP | 2003-140662 A | 5/2003 |
| JP | 2003-323351 A | 11/2003 |
| JP | 2003-330560 A | 11/2003 |
| JP | 2004-272341 A | 9/2004 |
| JP | 2004-303107 A | 10/2004 |
| JP | 2005-092830 A | 4/2005 |
| JP | 2005-159589 A | 6/2005 |
| JP | 2008-527597 A | 7/2008 |
| WO | WO 2005/008385 A2 | 1/2005 |
| WO | WO 2005/050528 A2 | 6/2005 |
| WO | WO 2006/009305 A1 | 1/2006 |
| WO | WO 2006/049476 A2 | 5/2006 |
| WO | WO 2006/051037 A1 | 5/2006 |
| WO | WO 2006/059887 A2 | 6/2006 |
| WO | WO 2006/073246 A2 | 7/2006 |
| WO | WO 2006/073259 A2 | 7/2006 |
| WO | WO 2006/073275 A2 | 7/2006 |
| WO | WO 2006/078121 A2 | 7/2006 |

* cited by examiner

INFORMATION PROCESSING APPARATUS, INFORMATION PROCESSING METHOD AND COMPUTER PROGRAM

CROSS REFERENCES TO RELATED APPLICATIONS

The present invention contains subject matter related to Japanese Patent Application JP 2007-154750 filed in the Japanese Patent Office on Jun. 12, 2007, the entire contents of which are incorporated herein by reference.

BACKGROUND OF THE INVENTION

1. Field of the Invention

The present invention relates to an information processing apparatus, an information processing method and a computer program. Particularly, the present invention relates to an information processing apparatus, an information processing method and a computer program that store data downloaded later from a server or data generated by a user into a local storage section, such as hard disc, and manage such data in association with contents stored in an information recording medium.

2. Background of the Related Art

Various kinds of software data, such as audio data on music or the like, image data on movies, game programs, and various application programs, and various software data (which are hereinafter called contents), can be stored in a recording medium, such as Blu-ray Disc (Registered Trademark), and an information recording medium, such as DVD (Digital Versatile Disc), as digital data. Blu-ray Disc (Registered Trademark) using a blue laser is a high-density recordable disc capable of recording a vast amount of video contents or so high-definition data.

A user is provided with a medium having digital contents stored therein, and can reproduce and use the contents with a reproducing apparatus like a PC (Personal Computer) or disc player owned by the user.

There are many contents, such as music data and image data, whose distribution rights their authors or sellers generally have. In distributing those contents, therefore, certain restrictions are made on accesses there to. For example, contents are encrypted, so that only authorized users are permitted to use the contents and illegitimate duplication thereof is prevented.

There has been proposed a content using system which downloads accessory data corresponding to contents recorded on discs like a DVD, caption data or dubbed data corresponding to, for example, movie contents, other contents-compatible service data, and contents like moving pictures and still pictures from a server as subsequent data, stores the subsequent data in a storage section like a hard disc in a reproducing apparatus, such as a PC, and plays back the data together with the contents recorded on a medium like DVD. Such a content using system is disclosed in, for example, JP-A-2003-140662 (Patent Document 1)

When subsequent data downloaded from a server as data corresponding to a stored content in a DVD or the like is stored in a storage unit of a reproducing apparatus, such as a PC, e.g., a local storage section like a hard disc, a lot of subsequent data corresponding to stored contents in many DVDs or Blu-ray Discs (Registered Trademark) will be stored in the local storage section. This makes it difficult for a user to find out that what subsequent data corresponding to which content in which medium the data stored in the local storage section is.

There is a structure in which meta data (attribute information) corresponding to stored data is recorded to be used in searching data stored in a local storage section. Such a structure is described in, for example, WO2006/073275 (Patent Document 2).

However, as mentioned above, data to be acquired later from a server in correspondence to a content recorded in a disc such as a DVD or subsequent data which is generated by a user is various types of data stored in a disc including caption data or dubbed data corresponding to, for example, movie contents, other contents-compatible service data, contents like moving pictures and still pictures, and game information, and plural pieces of different subsequent data may be stored in various local storage sections, such as a hard disc and flash memory, in correspondence to one stored-in-disc content. In such a case, it takes time for a user to search for intended subsequent data from a local storage section. There arises another problem that it is difficult to quickly grasp the contents of subsequent data in deleting unnecessary subsequent data.

SUMMARY OF THE INVENTION

It is desirable to provide an information processing apparatus, an information processing method and a computer program, which are configured to store subsequent data corresponding to contents stored in media, such as a DVD or Blu-ray Disc (Registered Trademark), e.g., data downloaded from a server, and user generated data in a local storage section like a hard disc, and can easily discriminate a medium or medium content corresponding to the subsequent data to achieve efficient usage and management of subsequent data.

According to a first embodiment of the present invention, there is provided an information processing apparatus including:

a storage section storing subsequent data subsequently acquired or generated as data corresponding to a medium stored content;

a control section executing a management process of managing subsequent data with respect to the storage section, the control section being configured to execute, as the management process of the subsequent data, a process of generating and recording subsequent data descriptive information including medium identification information corresponding to subsequent data and title identification information at a time of executing a process of recording subsequent data in the storage section, a process of generating display data based on the subsequent data descriptive information, and a process of reproducing or deleting subsequent data based on user designation information for the display data based on the subsequent data descriptive information.

According to one embodiment of the information processing apparatus of the present invention, the control section is configured to execute a process of recording (a) subsequent data management information including information to be used in reproducing at least subsequent data, (b) subsequent data actual data, and (c) the subsequent data descriptive information at a time of recording subsequent data in the storage section.

According to another embodiment of the information processing apparatus of the present invention, the control section is configured to set a directory corresponding to a date of acquiring or generating subsequent data, and set subsequent data and subsequent data relating information in the set directory.

According to a further embodiment of the information processing apparatus of the present invention, the control section is configured to execute a process of generating subsequent data descriptive information in which a file path to a subsequent data relating file to be reproduced or deleted which corresponds to the subsequent data descriptive information is set as meta data, and recording the subsequent data descriptive information in the storage section.

According to a still further embodiment of the information processing apparatus of the present invention, the control section is configured to execute a process of generating subsequent data descriptive information in which a file path to a subsequent data relating file to be reproduced or deleted which corresponds to the subsequent data descriptive information is set as meta data, and recording the subsequent data descriptive information in the storage section.

According to a yet still further embodiment of the information processing apparatus of the present invention, the control section is configured to execute a process of generating date information including a date of acquiring or generating subsequent data as the subsequent data descriptive information, and recording the date information in the storage section, and a process of generating display data including the date information and displaying the display data on a display section, as a display process for subsequent data descriptive information.

According to a yet still further embodiment of the information processing apparatus of the present invention, the control section is configured to execute a process of generating data including a user identifier of a user who has acquired or generated subsequent data information including a date of acquiring or generating subsequent data as the subsequent data descriptive information, and recording the data in the storage section, and a process of generating display data including the user identifier and displaying the display data on a display section, as a display process for subsequent data descriptive information.

According to a yet still further embodiment of the information processing apparatus of the present invention, the control section is configured to execute a process of generating data including size information of subsequent data as the subsequent data descriptive information, and recording the data in the storage section, and a process of generating display data including the size information and displaying the display data on a display section, as a display process for subsequent data descriptive information According to a yet still further embodiment of the information processing apparatus of the present invention, the control section is configured to execute a process of generating type information of subsequent data as the subsequent data descriptive information, and recording the type information in the storage section, and a process of generating display data including the type information and displaying the display data on a display section, as a display process for subsequent data descriptive information.

According to a second embodiment of the invention, there is provided an information processing method for executing a management process of managing subsequent data subsequently which is acquired or generated as data corresponding to a medium stored content in an information processing apparatus, the method including the step of allowing a control section of the information processing apparatus to execute, as the management process of the subsequent data, a process of generating and recording subsequent data descriptive information including medium identification information corresponding to subsequent data and title identification information at a time of executing a process of recording subsequent data in a storage section, a process of generating display data based on the subsequent data descriptive information, and a process of reproducing or deleting designated subsequent data based on user designation information for the display data based on the subsequent data descriptive information.

According to one embodiment of the information processing method of the present invention, the control section executes a process of recording (a) subsequent data management information including information to be used in reproducing at least subsequent data, (b) subsequent data actual data, and (c) the subsequent data descriptive information at a time of recording subsequent data in the storage section.

According to another embodiment of the information processing method of the present invention, the control section sets a directory corresponding to a date of acquiring or generating subsequent data, and sets subsequent data and subsequent data relating information in the set directory.

According to a further embodiment of the information processing method of the present invention, the control section executes a process of generating subsequent data descriptive information in which a file path to a subsequent data relating file to be reproduced or deleted which corresponds to the subsequent data descriptive information is set as meta data, and recording the subsequent data descriptive information in the storage section.

According to a still further embodiment of the information processing method of the present invention, the control section executes a process of generating subsequent data descriptive information in which a file path to a subsequent data relating file to be reproduced or deleted which corresponds to the subsequent data descriptive information is set as meta data, and recording the subsequent data descriptive information in the storage section.

According to a yet still further embodiment of the information processing method of the present invention, the control section executes a process of generating date information including a date of acquiring or generating subsequent data as the subsequent data descriptive information, and recording the date information in the storage section, and a process of generating display data including the date information and displaying the display data on a display section, as a display process for subsequent data descriptive information.

According to a yet still further embodiment of the information processing method of the present invention, the control section executes a process of generating data including a user identifier of a user who has acquired or generated subsequent data information including a date of acquiring or generating subsequent data as the subsequent data descriptive information, and recording the data in the storage section, and a process of generating display data including the user identifier and displaying the display data on a display section, as a display process for subsequent data descriptive information.

According to a yet still further embodiment of the information processing method of the present invention, the control section executes a process of generating data including size information of subsequent data as the subsequent data descriptive information, and recording the data in the storage section, and a process of generating display data including the size information and displaying the display data on a display section, as a display process for subsequent data descriptive information According to a yet still further embodiment of the information processing method of the present invention, the control section executes a process of generating type information of subsequent data as the subsequent data descriptive information, and recording the type information in the storage section, and a process of generating display data including the type information and displaying the display data on a display section, as a display process for subsequent data descriptive information.

According to a third embodiment of the invention, there is provided a computer program for allowing an information processing method to execute a management process of managing subsequent data subsequently which is acquired or generated as data corresponding to a medium stored content in an information processing apparatus, the computer program including the function of allowing a control section of the information processing apparatus to execute, as the management process of the subsequent data, a process of generating and recording subsequent data descriptive information including medium identification information corresponding to subsequent data and title identification information at a time of executing a process of recording subsequent data in a storage section, a process of generating display data based on the subsequent data descriptive information, and a process of reproducing or deleting designated subsequent data based on user designation information for the display data based on the subsequent data descriptive information.

It is to be noted that the computer program of the embodiment of the present invention can be supplied in a computer executable form to, for example, a general-purpose computer system capable of executing various program codes. Providing such a program in a computer executable form allows the computer system to achieve processes according to the program.

Other objects, features and advantages of the present invention are readily apparent from the following description together with the accompanying drawings. In the present specification, a "system" is a logical assembly of a plurality of apparatuses which need not be installed in the same casing.

According to the configuration of one embodiment of the present invention, in a case of storing subsequent data acquired or generated later as data corresponding to a content stored in a medium, such as a DVD, in a local storage section like a hard disc, descriptive information that can identify to which medium (information recording medium) or to which content the subsequent data stored in the storage section corresponds is set and recorded. A file path of a subsequent data relating file to be played or deleted is set as meta data in the descriptive information, and the file to be played or deleted is selected and processed using the meta data according to a user instruction for display data based on the descriptive information. This configuration can ensure a process of displaying a description on subsequent data which is easier for a user to understand, and reliable access to a file to be played or deleted based on a user's instruction, so that a process of reproduction, deletion or the like of subsequent data can be executed accurately and efficiently.

DESCRIPTION OF THE PREFERRED EMBODIMENT

The details of an information processing apparatus, information processing method and computer program of embodiments of the present invention will be described below with reference to the accompanying drawings. The description is given according to the following headings.

1. Outline of Configuration and Process of Information Processing Apparatus

2. Examples of Subsequent Data Managing Process in the Invention 2.1. First Example of Subsequent Data Managing Process 2.2. Second Example of Subsequent Data Managing Process 3. Examples of Application Subsequent Data Descriptive Information

[1. Outline of Configuration and Process of Information Processing Apparatus]

Figure 1:
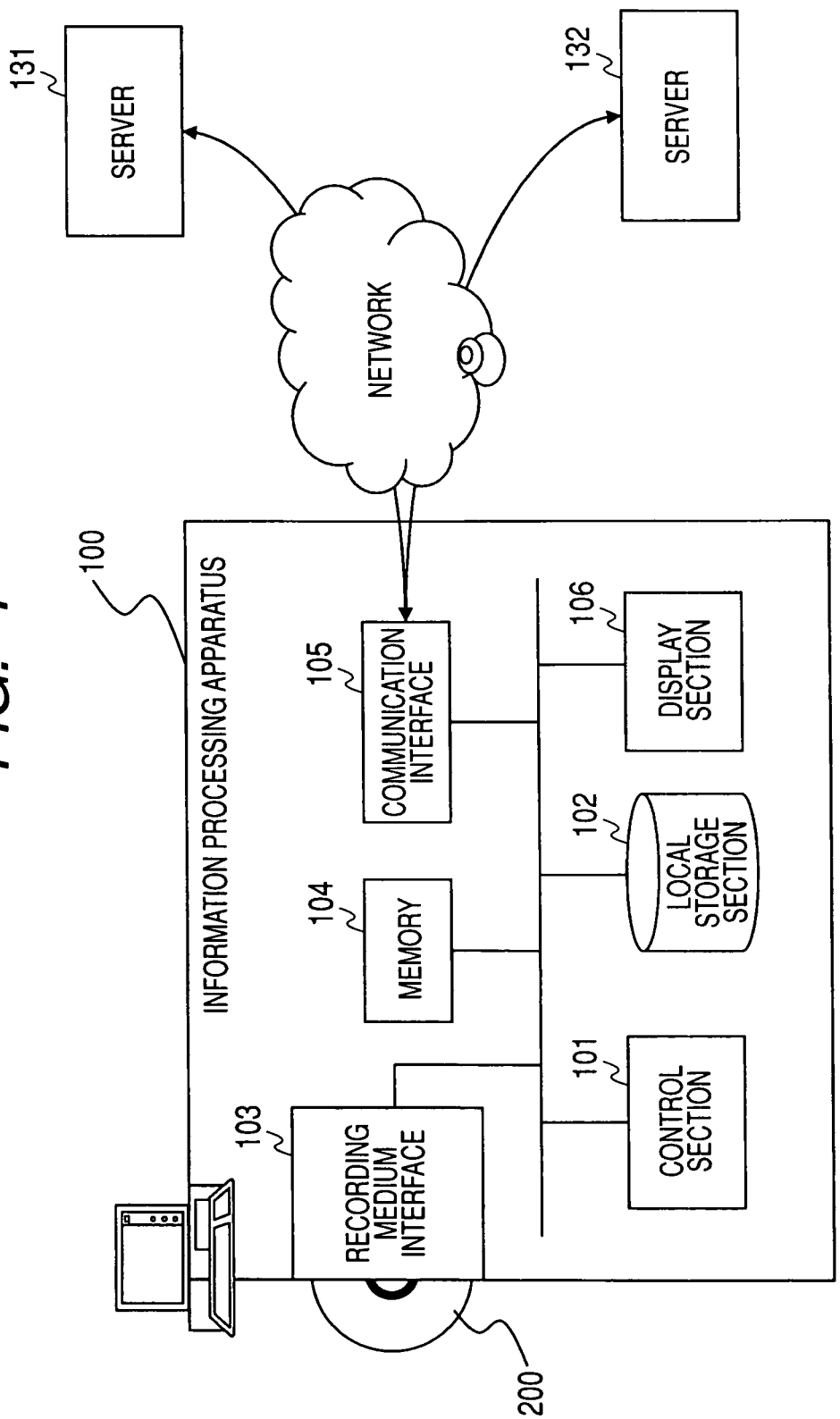
FIG. 1 is a diagram illustrating the configuration of an information processing apparatus according to one embodiment of the present invention.

To begin with, the out line of the configuration and process of an information processing apparatus according to one embodiment of the invention will be described. FIG. 1 is a diagram showing an information processing apparatus 100, such as a PC or a media player, which executes a playback process of an information recording medium (medium) 200, such as a DVD or Blu-ray Disc (Registered Trademark).

The information processing apparatus 100 includes:

a control section 101 having a program executing function, such as a CPU (Central Processing Unit), which executes a content play back process, subsequent data managing process and the like, a local storage section 102 which stores subsequent data, such as data downloaded from a server 131, 132 or user generated data as data corresponding to a content stored in the information recording medium (medium) 200, a recording medium interface 103 which performs data input/output process with respect to the information recording medium 200, a memory 104 configured by a ROM, RAM to be used for program executing area, a parameter storage area, etc., a communication interface 105 which executes communications over a network, and a display section 106 which displays a content and content information.

The local storage section 102 includes, for example, a hard disc, a flash memory, or the like.

The information processing apparatus 100 reads a content stored in the information recording medium 200 therefrom via the recording medium interface 103, and performs a playback process on the content. This process is executed under the control of the control section 101. There are various media available as the information recording medium 200 including, for example, a ROM medium having a content recorded therein and data rewritable R and RE types of media recording a content, for example, downloaded by a user from a server 131.

The information processing apparatus 100 acquires a sub content, which is usable in accordance with playback of a content stored in the information recording medium 200, such as caption data or dubbed data in case where the content stored in the information recording medium 200 is a movie content, and service data corresponding to the content stored in the information recording medium 200, via the server 131, 132, and stores the acquired data in the local storage section 102 including, for example, a hard disc or flush memory. When the content stored in the information recording medium 200 is a game program, subsequent data, such as score information and progress information, obtained by playing a game is stored in the local storage section 102.

Subsequent data to be stored in the local storage section 102 is data acquired or generated in correspondence to one of contents stored in the information recording medium 200. At the time of playing back a content stored in the information recording medium 200, the subsequent data is stored in the local storage section 102, and the subsequent data selected by the user is played back. In this playback process, for example, a VFS (Virtual File System) having a stored-in-disc content integrated with a content stored in the local storage section like a hard disc is constructed before being played back. The VFS-based playback process can allow playback similar to playback as if from a single medium.

The control section 101 generates or updates management information or descriptive information on subsequent data as needed at the time of recording subsequent data, and records the information in the local storage section 102. The control section 101 records the subsequent data and the management information or descriptive information in a directory for the subsequent data set in the local storage section 102.

Before going into a detailed description of a subsequent data managing process which is executed by the control section 101, definitions of terms to be used herein will be given.

(a) Managing Unit

A managing unit is also called a binding unit (BU: Binding Unit) which is set as a managing unit for subsequent data.

The binding unit (BU) is set as a unit including subsequent data generated or acquired later, such as a content downloaded from a server or user generated data, in correspondence to a content stored in the information recording medium 200. A lot of subsequent data is data reproducible according to the playback of a content stored in the information recording medium 200.

(b) Binding Unit Manifest File (BUMF)

A manifest file is a file storing management information on subsequent data.

A manifest file records subsequent data management information for each managing unit (binding unit (BU)), and is also called "binding unit manifest file (BUMF)".

While basically one binding unit manifest file (BUMF) is set for one binding unit manifest file (BUMF) for a single managing unit (BU), management information on a plurality of managing units can be allowed to be stored in a single manifest file (BUMF).

Figure 2:
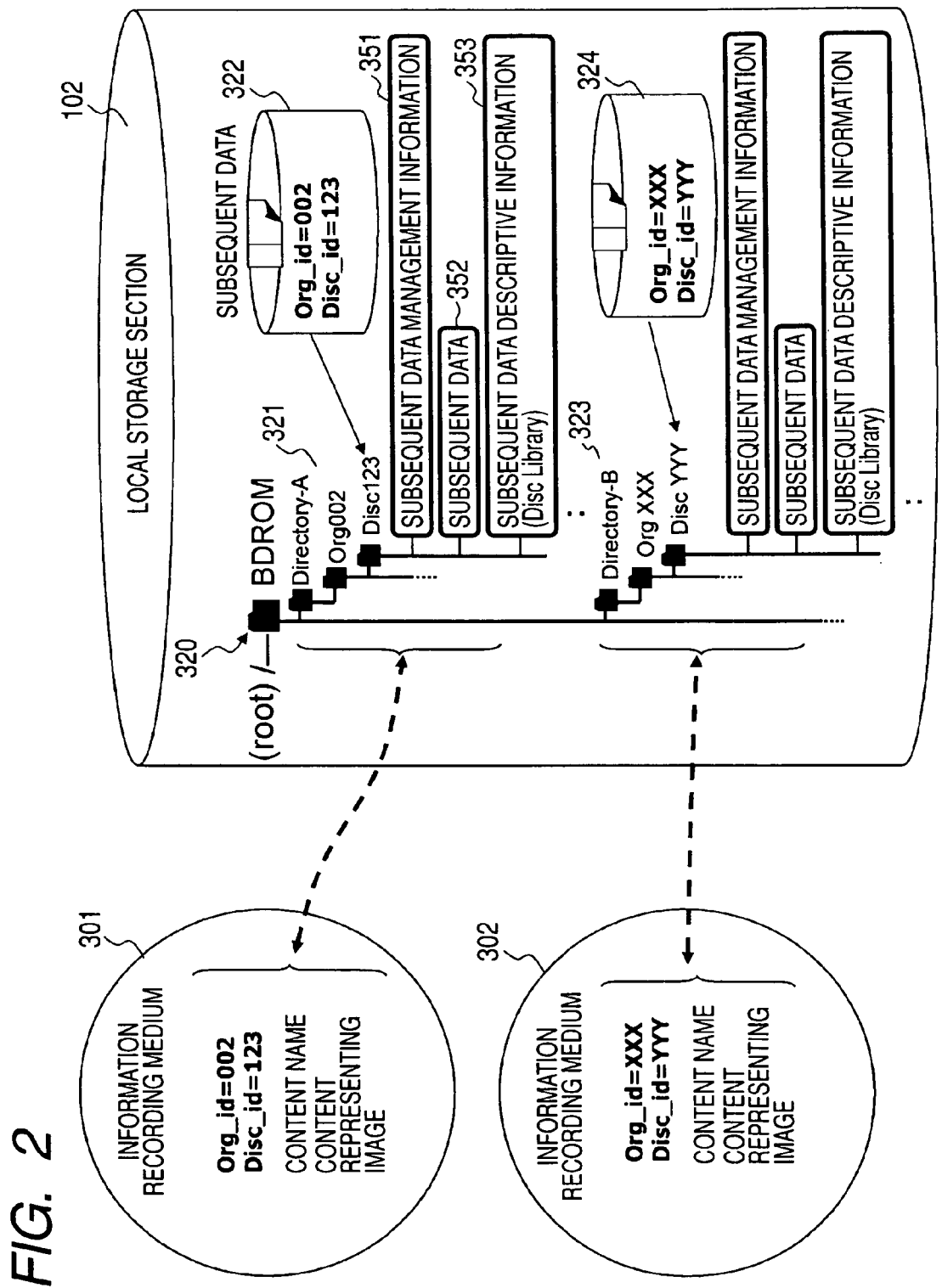
FIG. 2 is a diagram illustrating subsequent data to be recorded in a local storage section.

The outline of the management structure for subsequent data which is executed by the information processing apparatus 100 according to one embodiment of the present invention will be described referring to FIG. 2. FIG. 2 is a diagram illustrating the management structure for subsequent data in the local storage section 102, such as a hard disc.

The information processing apparatus 100 performs plays back stored-in-medium contents stored in various media (information recording media) 301, 302. Subsequent data acquired from a server or generated in the information processing apparatus 100 at the time of playback is recorded in the local storage section 102. A directory 320 shown in FIG. 2 is a subsequent-data recording directory. Subsequent data is recorded in directory separated for the respective medium. In the illustrated example, the medium (information recording medium) 301 is a medium with an organization ID (Org_id)=002 and disc ID (Disc_id)=123, and subsequent data corresponding to this medium is recorded in the directory corresponding to the disc ID (Disc_id)=123 set under a Directory-A321 in the local storage section 102.

The medium (information recording medium) 302 is a medium with an organization ID (Org_id)=XXX and disc ID (Disc_id)=YYY, and subsequent data corresponding to this medium is recorded in the directory corresponding to the disc ID (Disc_id)=YYY set under a Directory-B323 in the local storage section 102.

The organization ID (Org_id) is information to identify the provider of a content stored in the content storing medium or the manufacturer of a disc, and the disc ID (Disc_id) is an identify to identify a medium (disc) storing a specific content.

Subsequent data 322, 324 shown in FIG. 2 exemplarily shows subsequent data corresponding to the medium (information recording medium) 301 and subsequent data corresponding to the medium (information recording medium) 302, respectively. The subsequent data 322 is recorded under the Directory-A321 in the local storage section 102, and the subsequent data 324 is recorded under the Directory-B323 in the local storage section 102.

As illustrated in FIG. 2, subsequent data management information 351, subsequent data 352 (embodiment of subsequent data like a caption), and subsequent data descriptive information 353 are recorded in the local storage section 102 in correspondence to the respective subsequent data as subsequent data relating information.

[2. Examples of Subsequent Data Managing Process in the Invention]

The following will be described details of a plurality of examples of a subsequent data managing process which is executed by the information processing apparatus according to the embodiment of the present invention.

2.1. First Example of Subsequent Data Managing Process

Figure 3:
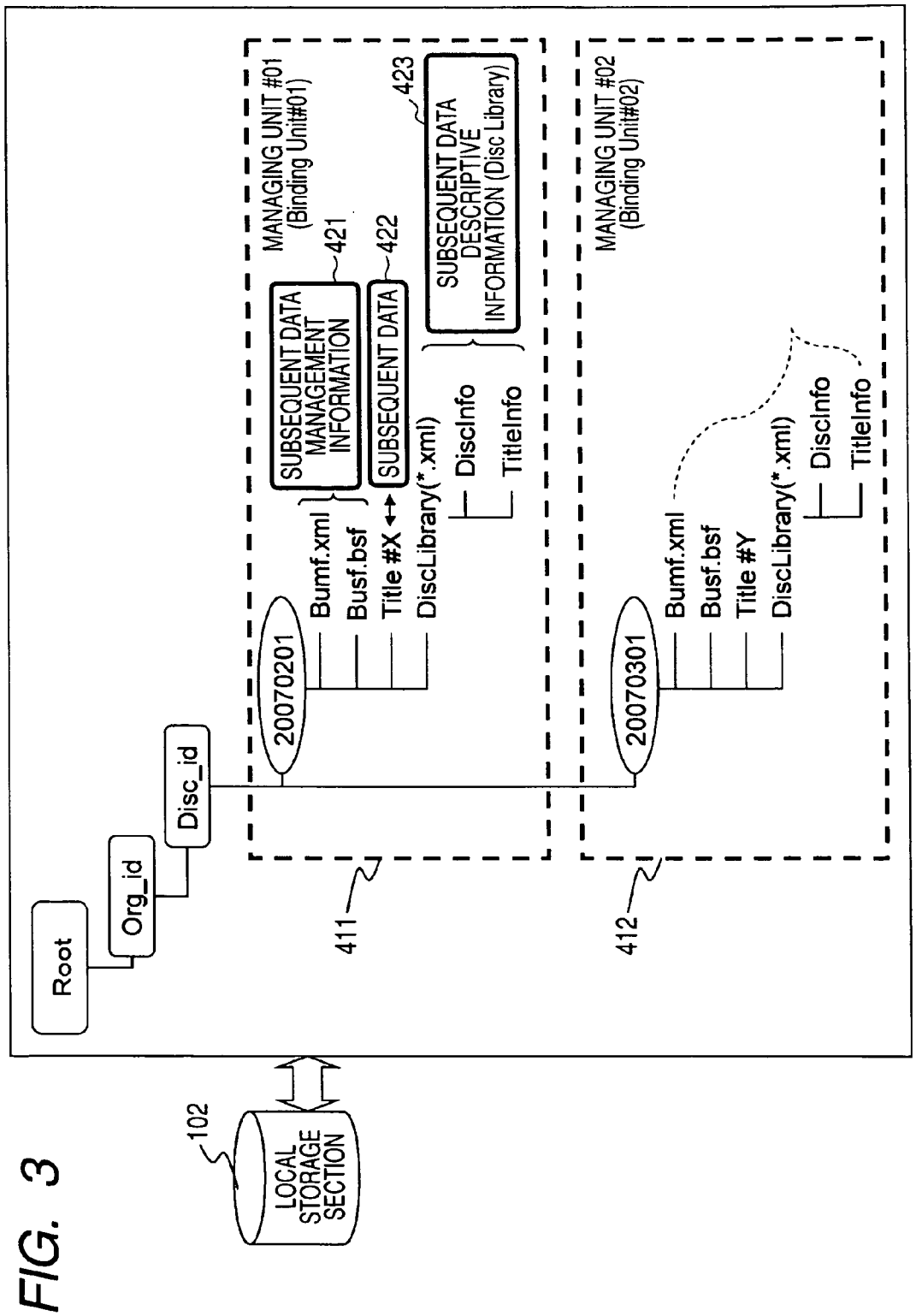
FIG. 3 is a diagram illustrating an example of the structure of a subsequent-data recording directory to be recorded in the local storage section.
Figure 4:
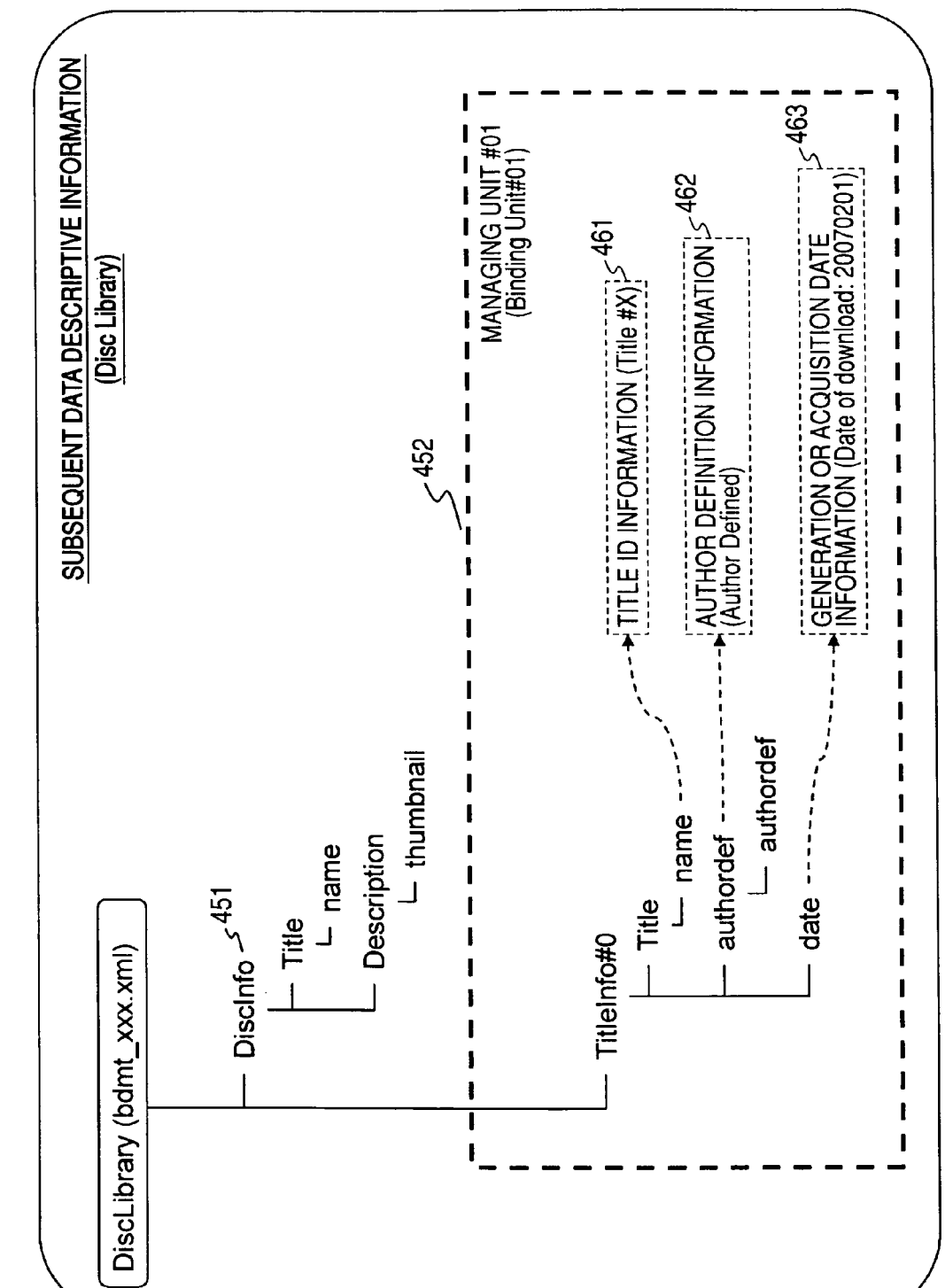
FIG. 4 is a diagram illustrating an example of a directory structure for subsequent data descriptive information to be recorded in the local storage section.

Referring to FIGS. 3 and 4, an example 1 of a subsequent data management process will be explained. The first subsequent data managing process example is a process example in which a managing unit (BU) and a manifest file are managed in one-to-one correspondence. That is, management information on a single managing unit (BU) is stored in a single manifest file (BUMF). Therefore, when a new managing unit is to be recorded, for example, a new binding unit manifest file (BUMF) corresponding to a managing unit to be additionally recorded is added, and when a managing unit is to be deleted, a binding unit manifest file (BUMF) corresponding to a managing unit to be deleted is deleted.

FIG. 3 shows a part of the structure of a subsequent-data storing directory to be recorded in the local storage section 102 of the information processing apparatus 100 shown in FIG. 1. In this example, a managing unit (BU) corresponding to a date on which subsequent data is acquired (downloaded or so) or generated is set, and managing-unit based data separation is carried out. That is, a date directory corresponding to a subsequent-data acquiring date is set, and a managing unit corresponding to each subsequent data is set in the date directory.

The subsequent-data storing directory is separated by the organization ID (Org_id) and disc ID (Disc_id) as has been explained above referring to FIG. 2. FIG. 3 shows the detailed structure of the directory under one disc ID (Disc_id).

In the example shown in FIG. 3, two managing units (BU#01, BU#02) 411, 412 corresponding to two different pieces of subsequent data are set in correspondence to a single content stored in the same disc. As mentioned above, there may be a case where plural pieces of different subsequent data are acquired for one disc, and the example shown in FIG. 3 shows a directory structure example in this case.

Each of the managing unit #01 411 and the managing unit #02 412 is set in the date directory corresponding to the date of acquisition of subsequent data through downloading or generation there of. Subsequent data corresponding to managing unit #01 411 shown in FIG. 3 is data set in correspondence to subsequent data acquired or generated on Feb. 1, 2007, and subsequent data corresponding to the managing unit #02 412 is data set in correspondence to subsequent data acquired or generated on Mar. 1, 2007.

As in the case explained above referring to FIG. 2, subsequent data management information 421, subsequent data 422 (embodiment of subsequent data like a caption), and subsequent data descriptive information 423 are recorded in the managing unit #01 411 as data corresponding thereto. Similar information is recorded in the managing unit #02 412.

At the time of recording subsequent data in the storage section, the control section of the information processing apparatus according to one embodiment of the present invention records the subsequent data management information 421, subsequent data 422 (embodiment of subsequent data like a caption) and subsequent data descriptive information 423 as a processing of managing subsequent data. The subsequent data descriptive information 423 includes medium identification (ID) information and title identification (ID) information which correspond to subsequent data. The control section of the information processing apparatus further executes a process of generating display data based on subsequent data descriptive information and a process of inputting user designation information for display data based on subsequent data descriptive information and playing back or deleting the subsequent data.

The control section of the information processing apparatus executes a process of setting, as meta data, the file path of a file to be played back or deleted, which is set in correspondence to subsequent data descriptive information, and then generating and recording subsequent data descriptive information in the storage section, and performing access to the file to be played back or deleted based on the meta data.

The subsequent data management information 421 is data including a binding unit manifest file (BUMF) explained above or a file storing management information on the subsequent data 422, and a binding unit signature file (BUSF) or information signed by the generation source of the subsequent data 422. In the structure example, management information on a single managing unit is set in a single binding unit manifest file (BUMF) included in the subsequent data management information 421.

The subsequent data 422 is data acquired from a server or so as data corresponding to a content stored in the information recording medium (disc) 200 with the structure shown in FIG. 1, such as a DVD or BD, or generated subsequent data, and is service data, such as trailer information containing advertisement information, or actual data of subsequent data, such as a caption.

The subsequent data descriptive information 423 is descriptive information corresponding to the subsequent data 422, and includes disc information (DiscInfo) and title information (TitleInfo). This descriptive information, which is written by, for example, XML data, can be read to be displayed on the display section by the user. This subsequent data descriptive information 423 is used at the time the user verifies, retrieves or deletes subsequent data stored in the local storage section by the user.

The disc information (DiscInfo) is information on a disc corresponding to the subsequent data 422, and includes the title of a disc and thumbnail information or the like corresponding to a content stored in the disc.

The title information (TitleInfo) includes corresponding title ID information (title name and subsequent data path information) of the subsequent data 422, and the type of the subsequent data 422, such as subsequent data definition information indicating whether the data is a caption or service data.

The structure example is effective for a process of retrieving subsequent data or a process of deleting subsequent data, both based on, for example, a download date.

FIG. 4 is a diagram illustrating a detailed structural example of one subsequent data descriptive information. As has been described referring to FIG. 3, subsequent data descriptive information is descriptive information on subsequent data and includes disc information (DiscInfo) 451 and title information (TitleInfo) 452.

The disc information (DiscInfo) 451 is information on a disc corresponding to the subsequent data, and includes the title of the disc and thumbnail information or the like corresponding to a content stored in the disc, as shown in FIG. 4.

The title information (TitleInfo) includes corresponding title ID information (title name or the like) 461 of a content stored in a medium (disc) corresponding to subsequent data, author definition information 462 on subsequent data, such as the type of the subsequent data indicating whether the data is a caption or service data, for example, and generation or acquisition date information 463 corresponding to a date (date) corresponding to the date on which the subsequent data is acquired (downloaded or so) or generated. Those pieces of information are written by, for example, XML data, and can be read to be displayed on the display section by the user.

The title ID information 461 includes, for example, the title name of a content corresponding to subsequent data, a user name (user ID) who has downloaded or generated the subsequent data, the data size of the subsequent data, access information (path information) for the subsequent data. Further, meta data, such as the file path of a file to be played back or deleted, which relates to the subsequent data corresponding to the subsequent data descriptive information, is also recorded.

For example, a relating file name in the local storage section is recorded as meta data in the descriptive information to be recorded in, for example, the title information (TitleInfo). This structure can allow the control section of the information processing apparatus to access a relating file based on meta data when descriptive information created by, for example, XML data is displayed on the display section and the user designates the descriptive information.

That is, when the title name and author definition information (Authordef) included in title information (TitleInfo) is displayed on the display section and the user designates those information, a relating subsequent data file, and meta data or path information to a file relating to subsequent data, such as the file name of subsequent data descriptive information [xxxx.mpls], are acquired, and playback or deletion of a file selected based on the path name is executed. In other words, the information processing apparatus can identify a file name recorded as meta data and execute a playback or deletion process.

(2.2. Second Example of Subsequent Data Managing Process)

Next, the second subsequent data managing process will be described referring to FIGS. 5, 6 and 7. This subsequent data managing process not only sets a managing unit (BU) and a manifest file in one-to-one correspondence, but also can set management information on a plurality of managing units in one manifest file (BUMF). That is, in this example, management information on N managing units can be set in a single manifest file (BUMF) where N is an integer equal to or greater than 1.

Figure 5:
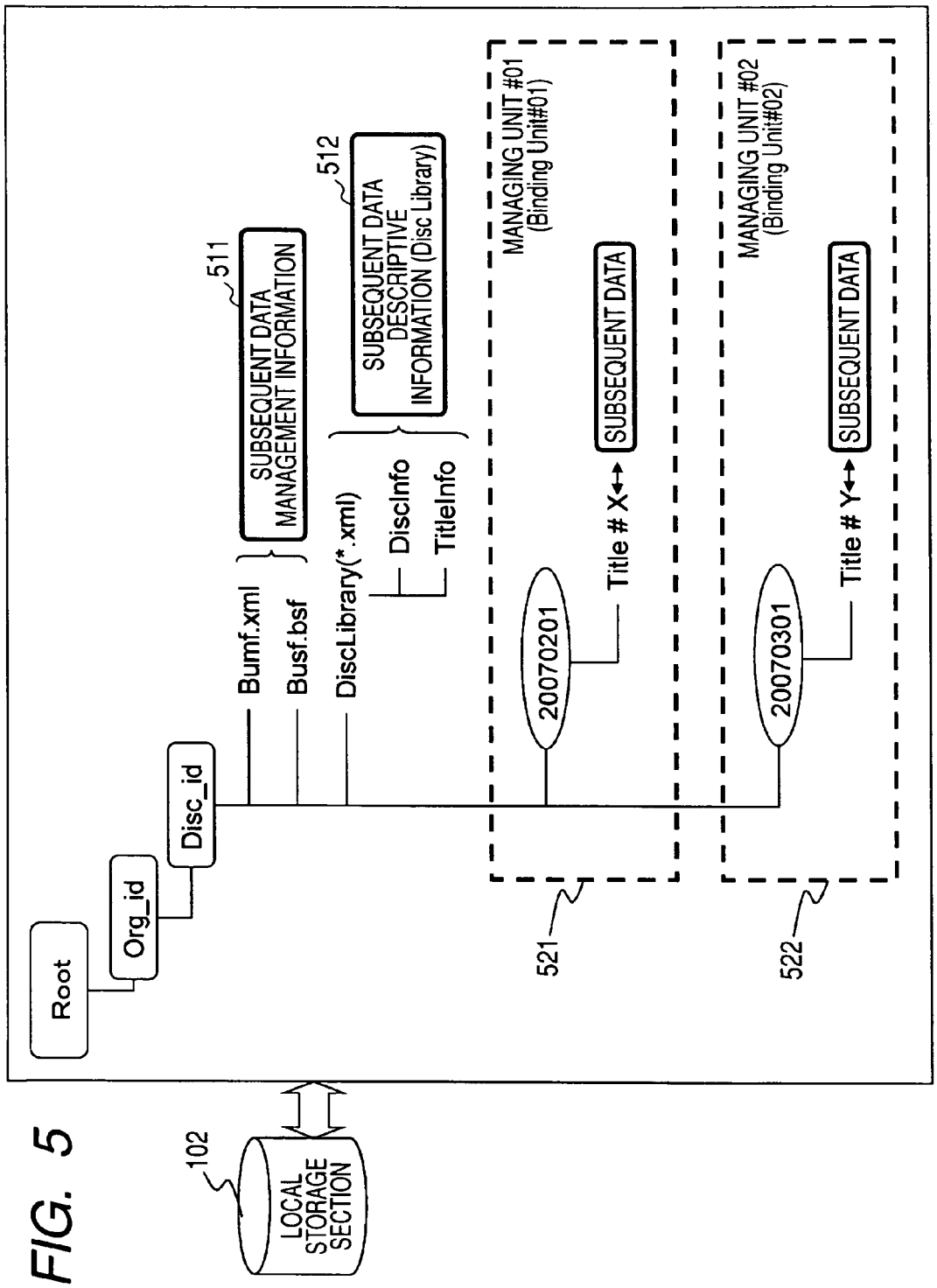
FIG. 5 is a diagram illustrating an example of a directory structure for subsequent data to be recorded in the local storage section.

FIG. 5 shows an example of a directory structure for subsequent data to be adopted in the second subsequent data managing process. As explained above referring to FIG. 2, the subsequent-data storing directory is separated by the organization ID (Org_id) and disc ID (Disc_id). FIG. 5 shows the details of a directory under one disc ID (Disc_id).

FIG. 5 shows an example where two managing units (BU#01, BU#02) corresponding to two different pieces of subsequent data are set in correspondence to a single content stored in the same disc. As mentioned above, there may be a case where plural pieces of different subsequent data are acquired for one disc, and the example shown in FIG. 5 shows a directory structure example in this case.

In the structure shown in FIG. 5, subsequent data management information 511 and subsequent data descriptive information 512 are structured so that one of the information is set for a disk ID. That is, in the directory in FIG. 3 already discussed, subsequent data management information and subsequent data descriptive information according to the number of pieces of subsequent data are set, whereas in this example, only one of the subsequent data management information 511 and subsequent data descriptive information 512 is set for a disk ID, and a plurality of managing units 521, 522 containing actual data of subsequent data are set. That is, in this structure, management information on N managing units where N is an arbitrary number equal to or greater than 1 can be set in a single manifest file (BUMF) included in the subsequent data management information 511.

Each of the managing units 521, 522 containing only actual data of subsequent data is set in a date directory set in correspondence to the date on which subsequent data is acquired through downloading or the like or generated as in the above-described structure of FIG. 3. Subsequent data corresponding to the illustrated managing unit #01 521 corresponds to subsequent data acquired or generated on Feb. 1, 2007, and subsequent data corresponding to the managing unit #02 522 corresponds to subsequent data acquired or generated on Mar. 1, 2007.

The managing unit #01 521 contains only subsequent data (embodiment data of a caption or the like) acquired or generated on Feb. 1, 2007. Subsequent data management information and subsequent data descriptive information, which correspond to this subsequent data, are respectively recorded in the subsequent data management information 511 and subsequent data descriptive information 512.

Likewise, the managing unit #02 522 contains only subsequent data (embodiment data of a caption or the like) acquired or generated on Mar. 1, 2007. Subsequent data management information and subsequent data descriptive information, which correspond to this subsequent data, respectively become the subsequent data management information 511 and subsequent data descriptive information 512.

In this structure example, management information on N managing units is set in a single manifest file (BUMF) included in the subsequent data management information 511.

Figure 6:
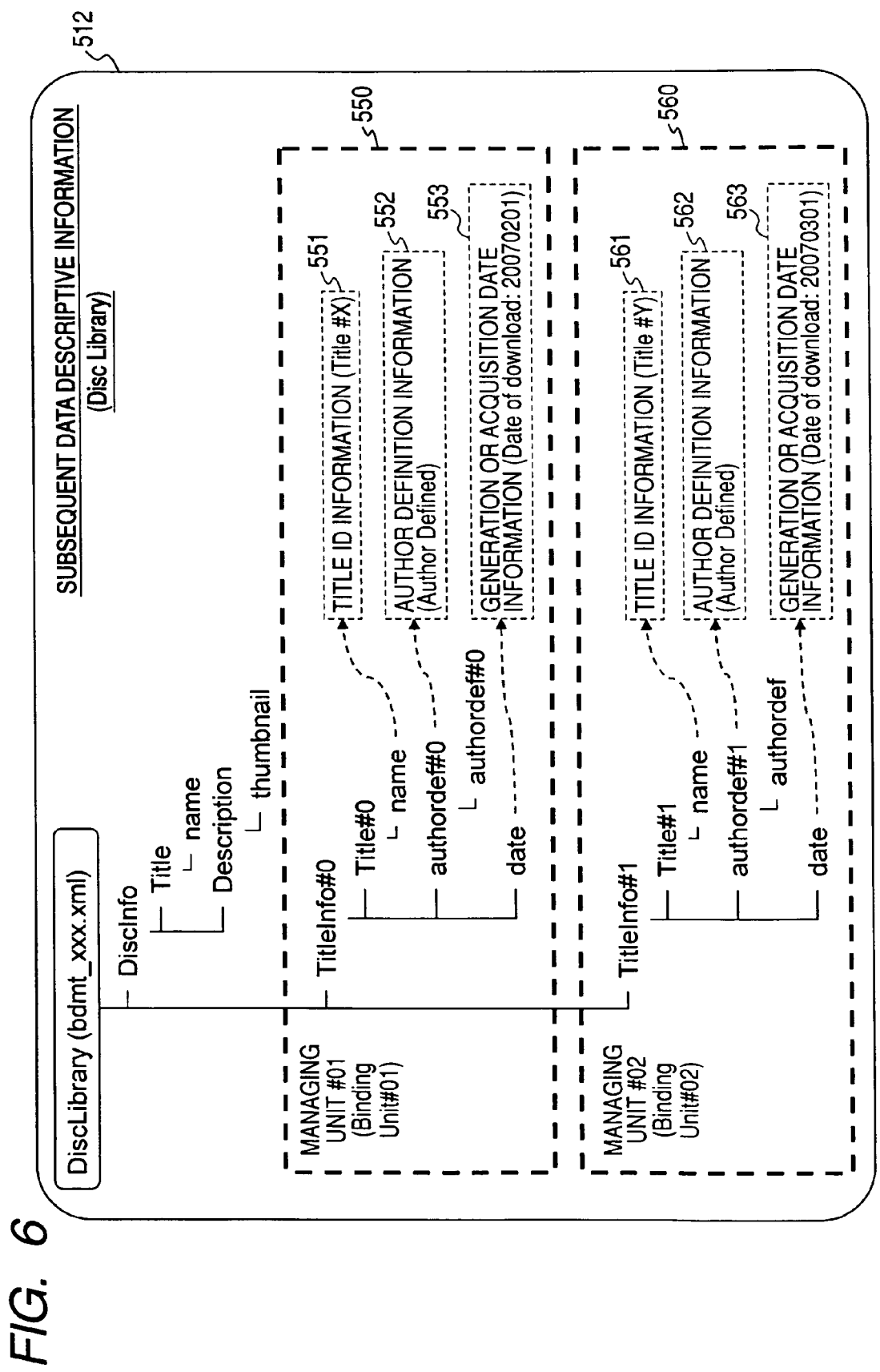
FIG. 6 is a diagram illustrating an example of a directory structure for subsequent data descriptive information to be recorded in the local storage section.
Figure 7:
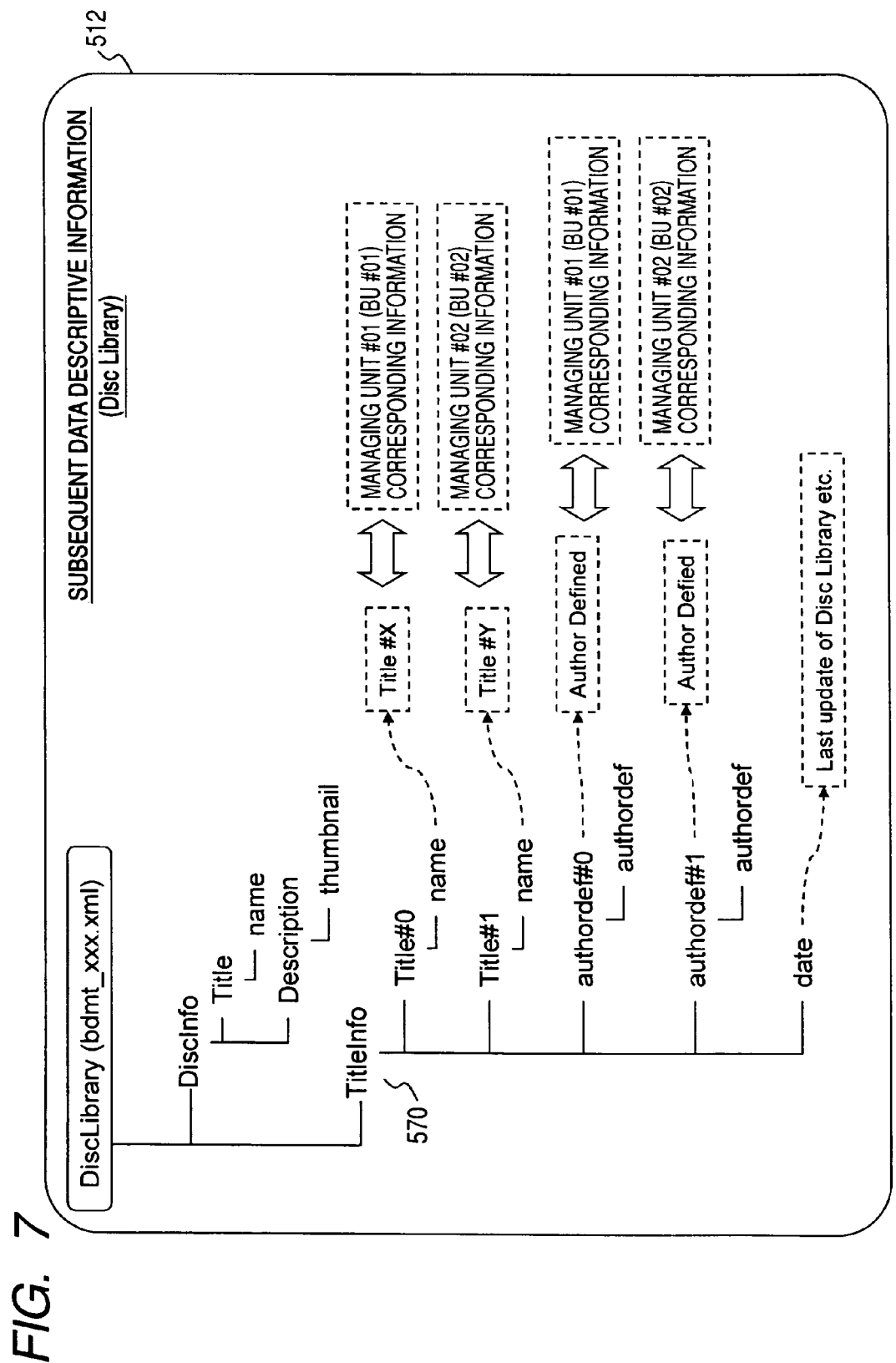
FIG. 7 is a diagram illustrating an example of a directory structure for subsequent data descriptive information to be recorded in the local storage section.

Referring to FIGS. 6 and 7, two directory structure examples for subsequent data descriptive information in the directory structure in FIG. 5 will be described.

To begin with, a first directory example for subsequent data descriptive information will be described referring to FIG. 6.

The subsequent data descriptive information is descriptive information on subsequent data, and includes disc information (DiscInfo) and title information (TitleInfo) as per the foregoing example.

The disc information (DiscInfo) is information on a disc corresponding to subsequent data, and includes the title of the disc and thumbnail information or the like corresponding to a content stored in the disc as shown in FIG. 6.

The title information (TitleInfo) has the directory setting separated for each managing unit in the example shown in FIG. 6.

A managing unit #01 550 is title information corresponding to subsequent data of the managing unit #01 521 shown in FIG. 5, and a managing unit #02 560 is title information corresponding to subsequent data of the managing unit #02 522 shown in FIG. 5.

The structure of the title information (TitleInfo) is similar to that of the example explained earlier referring to FIG. 4.

The managing unit #01 550 records therein title ID information (title name and subsequent data path information) 551 corresponding to subsequent data, author definition information 552 relating to subsequent data, such as the type of the subsequent data, e.g., information indicating whether the data is a caption or service data, and generation or acquisition date information 553 corresponding to a date (date) corresponding to the date on which the subsequent data is acquired (downloaded or so) or generated, as title information corresponding to subsequent data of the managing unit #01 521 shown in FIG. 5.

The managing unit #02 560 includes title ID information (title name or the like) 561 of a stored-in-medium content corresponding to subsequent data, author definition information 562 relating to subsequent data, such as the type of the subsequent data, e.g., information indicating whether the data is a caption, service data or game score information, and generation or acquisition date information 563 corresponding to a date (date) corresponding to the date on which the subsequent data is acquired (downloaded or so) or generated, as title information corresponding to subsequent data of the managing unit #02 522 shown in FIG. 5.

Referring now to FIG. 7, a second example of the directory structure for subsequent data descriptive information in the directory structure shown in FIG. 5 will be described. The subsequent data descriptive information is descriptive information on subsequent data and includes disc information (DiscInfo) and title information (TitleInfo).

The disc information (DiscInfo) is information on a disc corresponding to subsequent data, and includes the title of the disc and thumbnail information or the like corresponding to a content stored in the disc as shown in FIG. 6.

In this example, the title information (TitleInfo) does not have the directory setting separated for each managing unit, but is arranged for each data type. A title information (TitleInfo) directory 570 shown in FIG. 7 has the following information set therein.

Title#0-#01: title information (title name and subsequent data path information) to which each subsequent data corresponds, authordef#0-#1: author definition information relating to subsequent data, such as the type of each subsequent data, e.g., information indicating whether the data is a caption or service data, and date: generation or acquisition date information corresponding to a date (date) corresponding to the date on which the latest subsequent data is acquired (downloaded or so) or generated.

In the structure example, as apparent from the above, the title ID information and author definition information are set as data corresponding to each content, while the date data is recorded as the date on which the latest subsequent data is acquired or generated.

[3. Application Examples of Subsequent Data Descriptive Information]

Next, a description will be given of application examples of subsequent data descriptive information, which are executed by the information processing apparatus having the above-described subsequent data management structure. Subsequent data includes service data, such as a caption or trailer, which can be played back according to the playback of data stored in a disc like a DVD. When subsequent data is recorded in the local storage section, as mentioned above, subsequent data management information including a manifest file, subsequent data as actual data thereof, and subsequent data descriptive information (DiscLibrary) including various kinds of descriptive information relating to subsequent data are recorded, and each data corresponding to the recording mode is generated or updated.

Of those pieces of data, the subsequent data descriptive information (DiscLibrary) is used as information informing the user of the content of the subsequent data, described as XML data, and displayed on the display section through a display process of an application. The user can select a content (subsequent data) to be played back or a content to be deleted, based on display data.

A sequence in case where the subsequent data descriptive information is displayed on the display section, and content playback or content deletion based on selection made from the display information is carried out will be described referring to a flowchart illustrated in FIG. 8.

Figure 9:
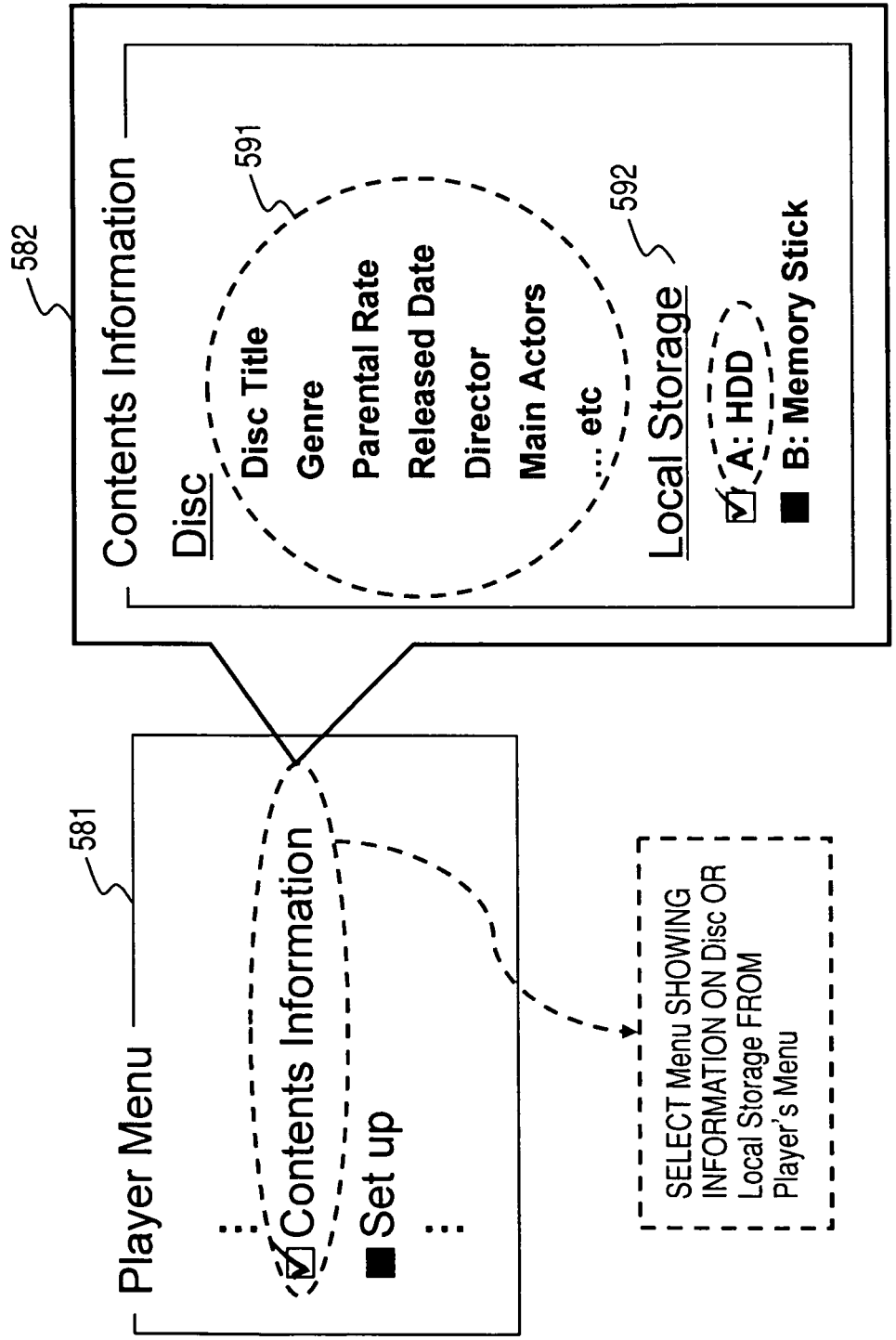
FIG. 9 is a diagram illustrating a display process for subsequent data descriptive information in the information processing apparatus according to the embodiment of the present invention.

First, in step S101, content descriptive information is displayed on the display section (UI). One example of the process will be described referring to FIG. 9. An application which is executed by the control section displays a player menu 581 on the display section, so that the user selects display of content information (Content Information). The application which is executed by the control section displays content information 582 shown in FIG. 9 according to a user input.

The content information includes stored-in-disc content information 591 recorded on a disc set in the information processing apparatus, and local storage section select information 592 or select information for a local storage section where subsequent data is stored. The user selects a local storage section whose information is to be displayed is selected from the local storage section select information 592. In the illustrated example, an HDD is selected.

Figure 10:
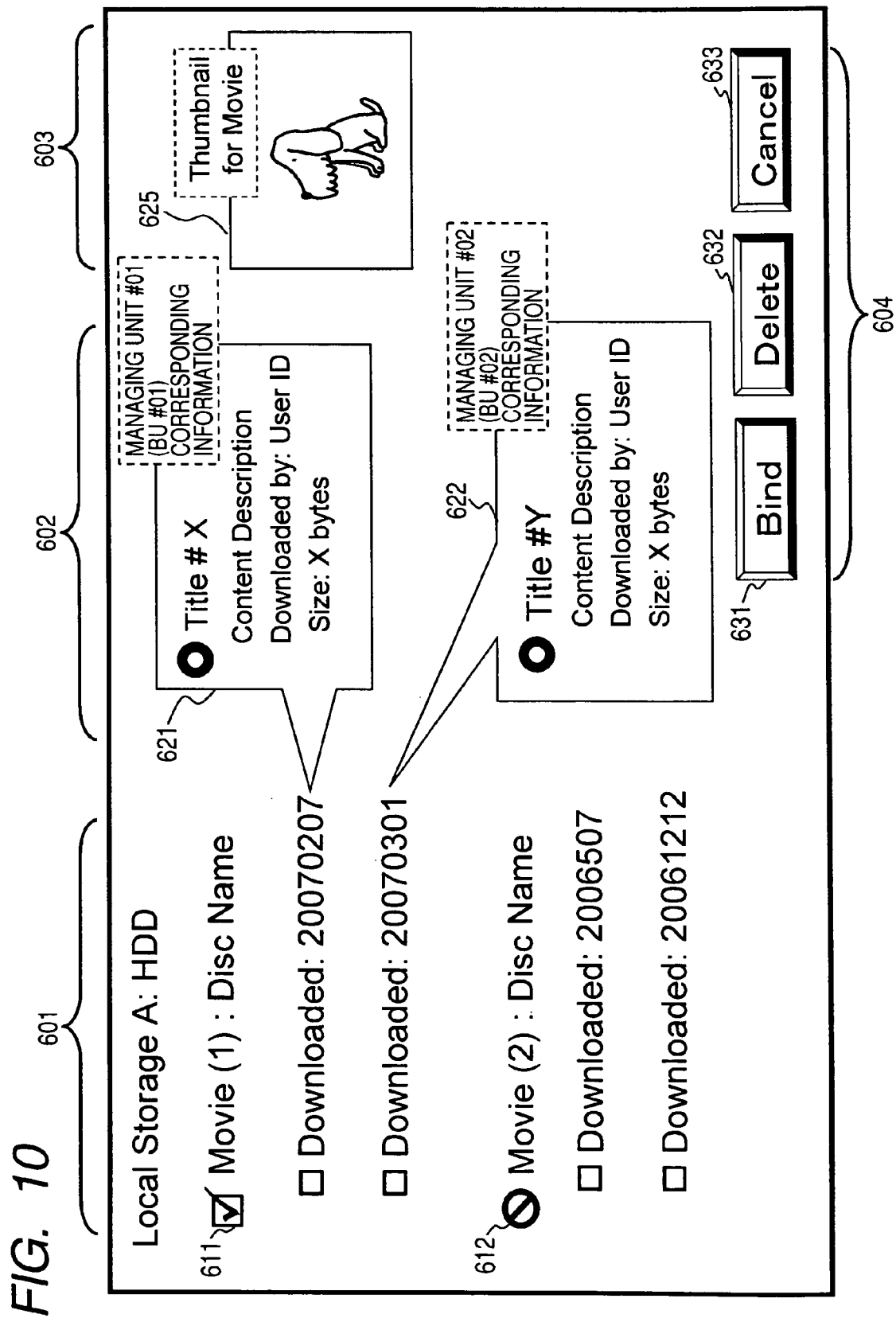
FIG. 10 is a diagram illustrating an example of a display process for subsequent data descriptive information in the information processing apparatus according to the embodiment of the present invention.

With this select process performed, the application which is executed by the control section reads descriptive information on subsequent data stored in the hard disc and displays the descriptive information on the display section. A display example is shown in FIG. 10. FIG. 10 shows an example of display data based on subsequent data descriptive information on the subsequent data recorded in the local storage section [HDD]. As mentioned above, the subsequent data descriptive information is described by XML data, and the application which is executed by the control section expands XML data and performs a display process on, for example, descriptive information as shown in FIG. 10.

The subsequent data descriptive information shown in FIG. 10 roughly includes date information (download date or the like) 601 stored in the title information (TitleInfo) in the content descriptive information, detailed information 602 which describes subsequent data recorded in the content descriptive information, thumbnail information 603 and a process select button 604.

The date information (download date or the like) 601 is displayed with subsequent data date information to which each disc corresponds being separated. A mark 612 indicates that deletion is not permitted. Checking on a mark 611 indicates that the mark is selected by the user.

The detailed information 602 includes the title name of subsequent data, the name of a user (user ID) who has downloaded or generated the subsequent data, and the data size of the subsequent data. Those pieces of information are included in the title ID information of the title information (TitleInfo) in the subsequent data descriptive information. Detailed information 621 in the detailed information 602 corresponds to subsequent data downloaded on Feb. 7, 2007 displayed as the date information (download date or the like) 601. Detailed information 622 in the detailed information 602 corresponds to subsequent data downloaded on Mar. 1, 2007 displayed as the date information (download date or the like) 601.

The thumbnail information 603 is included in the disc information (DiscInfo) in the subsequent data descriptive information. Display data based on information included in the subsequent data descriptive information is displayed on the display section.

The process select button 604 includes a bind (Bind) button 631 for executing a playback process, a delete (Delete) button 632 for instructing deletion of subsequent data, and a cancel (Cancel) button 633 for a cancel process. The display example shown in FIG. 10 is just an example which is not restrictive, and information display using various kinds of data included in the content descriptive information is possible.

Figure 8:
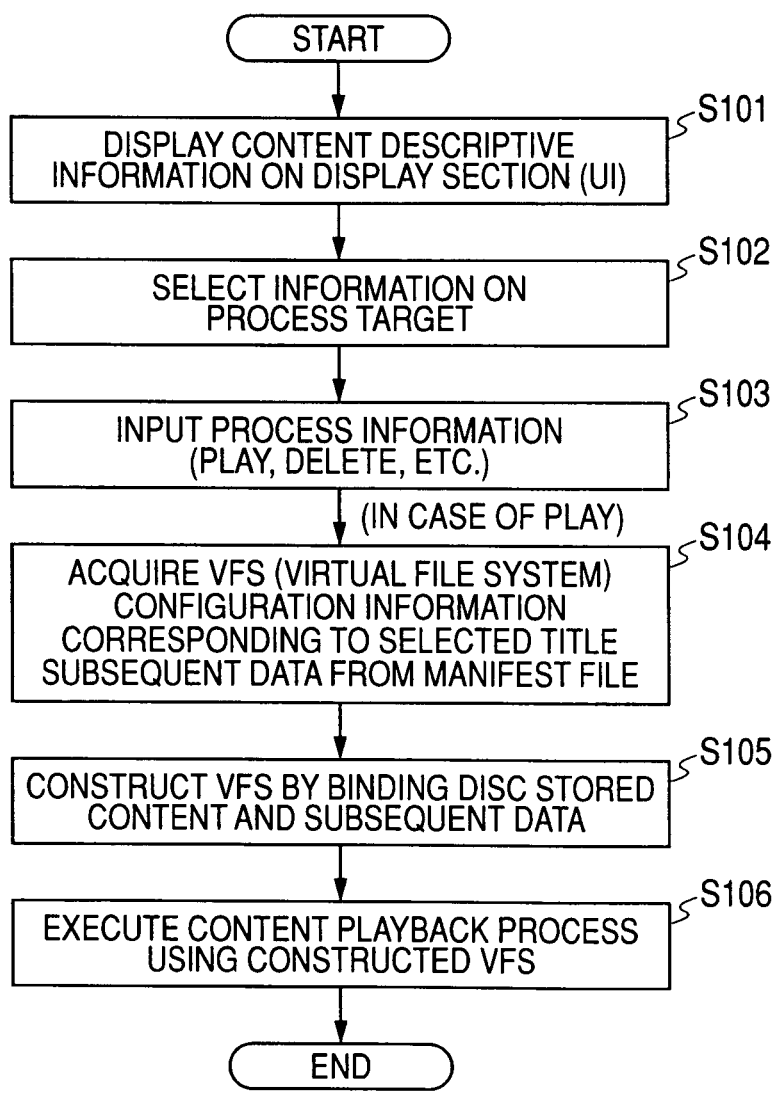
FIG. 8 is a flowchart illustrating display of descriptive information of subsequent data descriptive information and a display-information based process sequence in the information processing apparatus according to the embodiment of the present invention.

Returning to the flowchart in FIG. 8, a description of the sequence in case where display of content descriptive information and the selection-based content playback or deletion process are executed continues. After display of information shown in FIG. 10, for example, is executed in step S101, subsequent data to be processed (played or deleted) is selected in step S102, and a button to determine process information (playback or deletion) (process select button 604 in FIG. 10) is operated to input a process instruction in step S103.

The control section of the information processing apparatus executes a process in response to the process instruction, specifically, content playback using the selected subsequent data or deletion of the selected subsequent data. The following description will be given on the assumption that content playback has been designated.

When the content playback is designated, VFS (Virtual File System) construction information corresponding to the title-selected subsequent data is acquired from the manifest file in step S104. This is achieved by reading the manifest file associated with the selected subsequent data.

Next, a VFS (Virtual File System) is constructed by the process of binding stored-in-disc content and subsequent data in step S105, and the content playback process using the constructed VFS is executed in step S106. Content playback based on the selection of subsequent data is carried out in this manner.

In the process of displaying subsequent data descriptive information according to one embodiment of the present invention, even when there are plural pieces of subsequent data corresponding to the same content stored in the same disc, it is possible to organize and display disc information and title information to which each subsequent data corresponds, as shown in FIG. 10. This can allow the user to easily discriminate a disc and a content which correspond to the content of each subsequent data, and efficiently and reliably select subsequent data to be played back or deleted.

Figure 11:
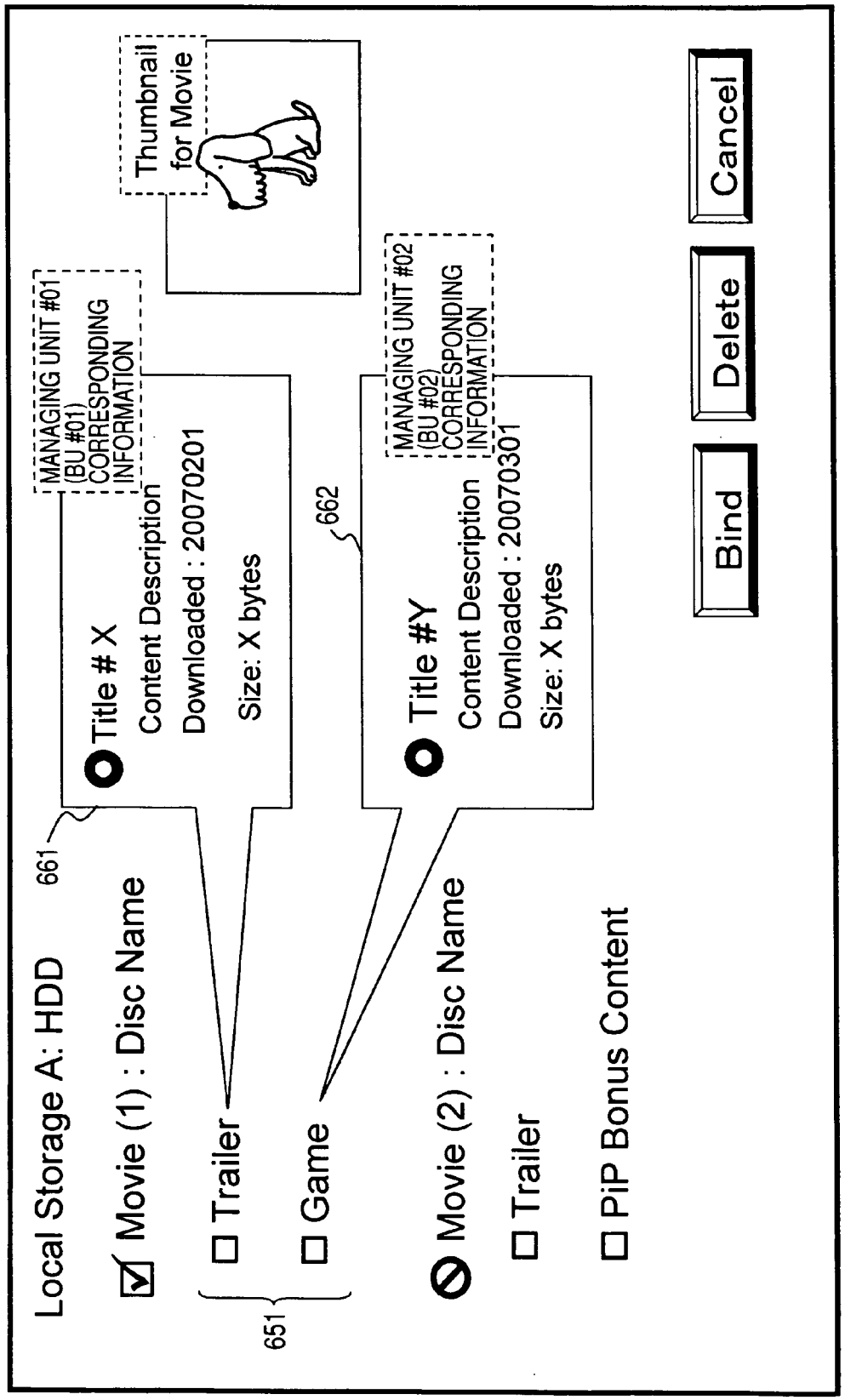
FIG. 11 is a diagram illustrating another example of a display process for subsequent data descriptive information in the information processing apparatus according to the embodiment of the present invention.

Although one display example of subsequent data descriptive information has been described, a display example different from the one in FIG. 10 is shown in FIG. 11. While FIG. 10 shows the example where date data is used as an index, FIG. 11 shows an example where author definition information (author Defined) is used as an index 651. Specifically, as definition information representing the type or the like of subsequent data, definition information, such as [trailer (Trailer)] or [game (Game)], is displayed as an index for subsequent data. This definition information is included in the author definition information (author Defined) in the above-described title information (TitleInfo).

Detailed information 661 corresponds to subsequent data corresponding to the [trailer (Trailer)] displayed as the index 651, and detailed information 662 corresponds to the [game (Game)] displayed as the index 651. Information display using the subsequent data descriptive information is executed in various modes.

Figure 12:
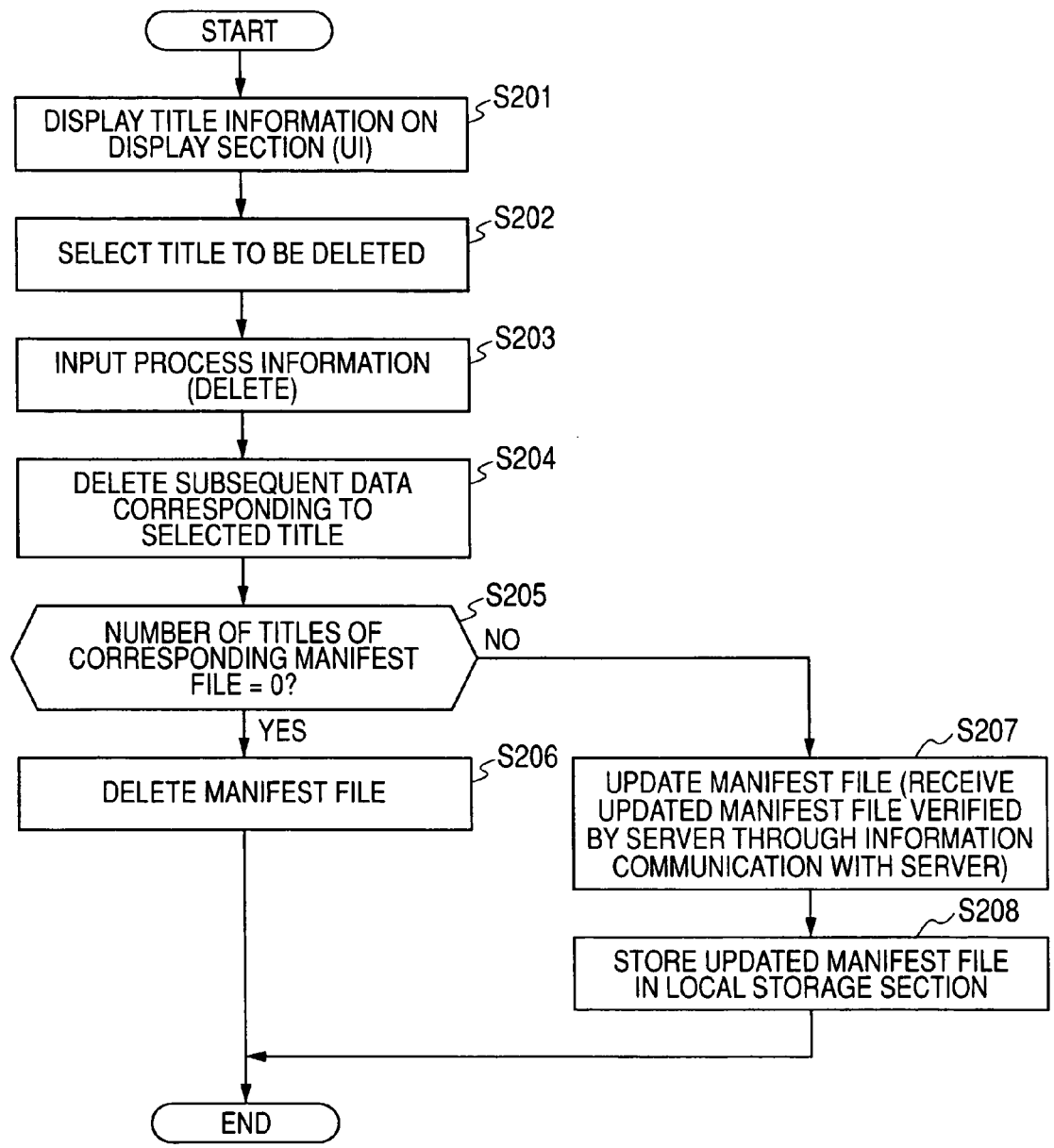
FIG. 12 is a flowchart illustrating display of descriptive information of subsequent data descriptive information and a display-information based process sequence in the information processing apparatus according to the embodiment of the present invention.

A sequence in case where subsequent data descriptive information is displayed on the display section, and a content deletion process based on selection made from the display information is carried out will be described referring to a flowchart illustrated in FIG. 12.

First, in step S201, content descriptive information is displayed on the display section (UI). This process and the example of display data are the same as have been described earlier referring to FIGS. 9 to 11. After display of information shown in FIG. 10, for example, is executed in step S201, subsequent data to be deleted is selected in step S202, and a button to determine process information (deletion) (delete (Delete) button 632 in FIG. 10) is operated to input a process instruction in step S203.

When the subsequent data deletion is designated, the control section of the information processing apparatus executes the process of deleting the designated subsequent data. While the deletion instruction made by the user is executed based on designation of various kinds of descriptive information included in the title information (TitleInfo) in the content descriptive information, as mentioned above, a relating file name in the local storage section is recorded as meta data, so that when the user designates various information, a title name and author definition information (Authordef) included in the title information (TitleInfo) displayed on the display section, the control section acquires meta data or path information for a subsequent data relating file, such as a relating subsequent data file corresponding to the designated information and subsequent data descriptive information file name [xxxx.mpls], and executes a deletion process based on the acquired path information. That is, the information processing apparatus can identify a relating file name from the meta data corresponding to information designated by the user, and execute the deletion process accordingly.

Next, in step S205 or subsequent steps, a manifest file corresponding to the deleted subsequent data is deleted or updated. In step S205, the manifest file corresponding to the deleted subsequent data is acquired, and it is determined whether subsequent data management information recorded in the manifest file is only subsequent data corresponding to the deleted subsequent data and whether subsequent data to be managed has disappeared, i.e., whether the number of titles managed by the manifest file becomes 0. When the number of titles managed by the manifest file becomes 0, the manifest file becomes unnecessary, and the process goes to step S206 to delete the manifest file corresponding to the deleted subsequent data, after which the process is terminated.

This process is executed in case of [2.1. First Example of Subsequent Data Managing Process] explained above referring to FIGS. 3 and 4 or where managing units correspond one to one to manifest files (BUMF).

When subsequent data management information recorded in the manifest file is not just subsequent data corresponding to the deleted subsequent data and subsequent data to be managed has not disappeared, i.e., when the number of titles managed by the manifest file is not 0, the process goes to step S207 to update the manifest file. At the time of performing the update process, the control section receives an updated manifest file verified by the server through information communication with the server.

In the next step S208, the updated manifest file is stored in the local storage section, after which the process is terminated. This process is executed in case of [2.2. Second Example of Subsequent Data Managing Process] explained above referring to FIGS. 5 to 7 or where managing units do not correspond one to one to manifest files (BUMF), but information on a plurality of managing units is recorded in a single manifest file (BUMF).

Even in deleting subsequent data, reliable deletion based on efficient identification of subsequent data is apparently possible. That is, information display of subsequent data according to the present invention can allow disc information or title information to which each subsequent data corresponds to be organized and displayed as shown in FIG. 10, so that the user can easily discriminate the content of each subsequent data, and a disc and a content which correspond to the subsequent data, and can efficiently select subsequent data to be played back or deleted.

Figure 13:
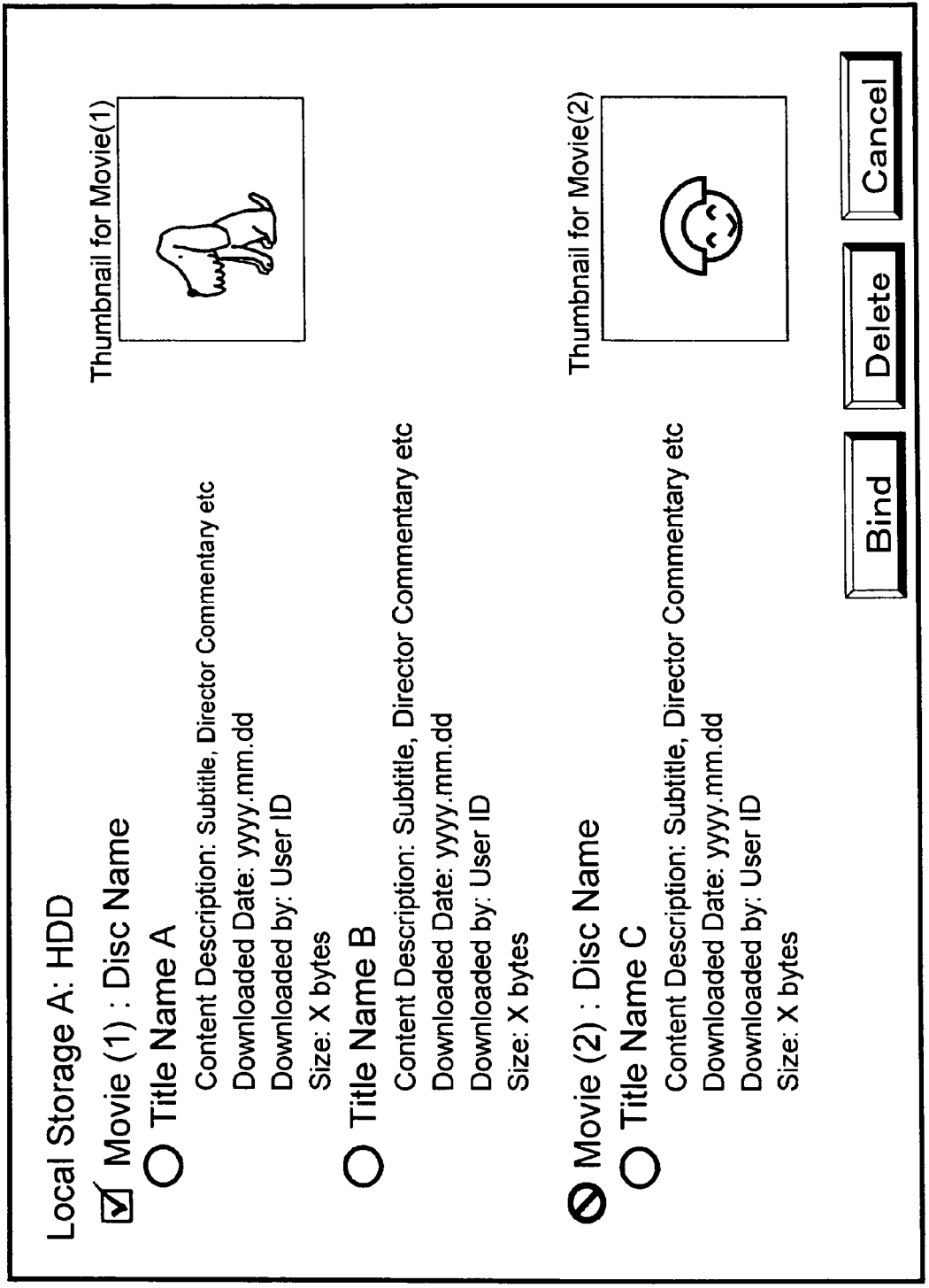
FIG. 13 is a diagram illustrating an example of a display process for subsequent data descriptive information in the information processing apparatus according to the embodiment of the present invention.

FIG. 13 shows an example of display of content descriptive information, which differs from the display examples in FIGS. 10 and 11. This display example has a title corresponding to subsequent data corresponding to each disc being used as an index and detailed information thereof being a list. That is, in the display example, the following detailed information is displayed in correspondence to each piece of subsequent data.

(1) Title (Title)
(a) content information (Content Description)
(b) download date (Downloaded Data)
(c) download user (Downloaded by), and
(d) subsequent data size (Size)

Further, the local storage section 102 may be configured to include information indicating whether the local storage section is a removable storage section.

The present invention has been elaborated referring to a specific embodiment. It should be understood by those skilled in the art that various modifications, combinations, sub-combinations and alterations may occur depending on design requirements and other factors insofar as they are within the scope of the appended claims or the equivalents thereof. Therefore, the present examples and embodiment are to be considered as illustrative and not restrictive and the present invention is not to be limited to the details given herein, but may be modified within the scope of the appended claims.

A sequence of processes that has been explained herein can be carried out by hardware, software or a combination thereof. In case of software-based execution of the processes, a program recording the process sequence can be installed in a memory in a computer having dedicated hardware installed therein and executed, or the program can be installed in and executed on a general-purpose computer which can perform various processes. For example, the program can be prerecorded in a recording medium. The program can be installed into a computer from the recording medium, as well as received over a network, such as LAN (Local Area Network) or Internet, and installed into a recording medium, such as a built-in hard disc.

Various kinds of processes described herein may be executed not only time-sequentially according to the descriptions, but also in parallel or individually according to the process performance of the apparatus which executes the processes or as needed. In the present specification, a "system" is a logical assembly of a plurality of apparatuses which need not be installed in the same casing.

According to the configuration of one embodiment of the present invention, as has been described above, in a case of storing subsequent data acquired or generated later as data corresponding to a content stored in a medium, such as a DVD, in a local storage section like a hard disc, descriptive information that can identify to which medium (information recording medium) or to which content the subsequent data stored in the storage section corresponds is set and recorded. A file path of a subsequent data relating file to be played or deleted is set as meta data in the descriptive information, and the file to be played or deleted is selected and processed using the meta data according to a user instruction for display data based on the descriptive information. This configuration can ensure a process of displaying a description on subsequent data which is easier for a user to understand, and reliable access to a file to be played or deleted based on a user's instruction, so that a process of reproduction, deletion or the like of subsequent data can be executed accurately and efficiently.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus comprising:
a storage section configured to store subsequent data subsequently acquired or generated as data corresponding to a medium stored content, the subsequent data comprising first subsequent data and second subsequent data; and
a control section configured to execute a management process of managing the subsequent data with respect to the storage section, the control section being configured to execute, as the management process of the subsequent data,
a first process of recording first subsequent data descriptive information and first subsequent data management information corresponding to the first subsequent data, the first subsequent data descriptive information comprising type information of the first subsequent data, medium identification information, and title identification information, the first subsequent data management information being recorded in a manifest file, the recording occurring at a time of recording the first subsequent data in the storage section,
a second process of generating display data based on the first subsequent data descriptive information, and
a third process of reproducing or deleting the first subsequent data in response to user designation information for the display data,
wherein the third process comprises, in a case where the user designation information designates deletion of the first subsequent data and the manifest file comprises second subsequent data management information corresponding to the second subsequent data, obtaining an updated manifest file and recording the updated manifest file in the storage section.

2. The information processing apparatus according to claim 1, wherein the first subsequent data management information comprises information to be used in reproducing at least the first subsequent data, and the control section is configured to execute a fourth process of recording the subsequent data.

3. The information processing apparatus according to claim 1, wherein the control section is configured to set a directory corresponding to a date of acquiring or generating the first subsequent data, and set the first subsequent data and subsequent data relating information in the directory.

4. The information processing apparatus according to claim 1, wherein the first subsequent data descriptive information further includes, as metadata, file path information for a subsequent data relating file, and the control section is configured to use the file path information to access the subsequent data relating file when executing the third process.

5. The information processing apparatus according to claim 1, wherein the first subsequent data descriptive information further includes title information of the first subsequent data, and
the control section is configured to execute a fourth process of displaying the display data on a display section.

6. The information processing apparatus according to claim 1, wherein the first subsequent data descriptive information further includes date information including a date of acquiring or generating the first subsequent data, and
the control section is configured to execute a fourth process of displaying the display data on a display section.

7. The information processing apparatus according to claim 1, wherein the first subsequent data descriptive information further includes a user identifier of a user who has acquired or generated the first subsequent data, and
the control section is configured to execute a fourth process of displaying the display data on a display section.

8. The information processing apparatus according to claim 1, wherein the first subsequent data descriptive information further includes size information of the first subsequent data, and
the control section is configured to execute a fourth process of displaying the display data on a display section.

9. An information processing method for managing subsequent data which is subsequently acquired or generated as data corresponding to a medium stored content in an information processing apparatus, the subsequent data comprising first subsequent data and second subsequent data, the method comprising:
recording first subsequent data descriptive information and first subsequent data management information corresponding to the first subsequent data, the first subsequent data descriptive information comprising type information of the first subsequent data, medium identification information, and title identification information, the first subsequent data management information being recorded in a manifest file, the recording occurring at a time of recording the first subsequent data in a storage section;
generating display data based on the first subsequent data descriptive information; and
reproducing or deleting the first subsequent data in response to user designation information for the display data,
wherein the reproducing or deleting comprises, in a case where the user designation information designates deletion of the first subsequent data and the manifest file comprises second subsequent data management information corresponding to the second subsequent data, obtaining an updated manifest file and recording the updated manifest file in the storage section.

10. The information processing method according to claim 9, further comprising recording the subsequent data, wherein the first subsequent data management information comprises information to be used in reproducing at least the first subsequent data.

11. The information processing method according to claim 9, further comprising setting a directory corresponding to a date of acquiring or generating the first subsequent data, and setting the first subsequent data and subsequent data relating information in the directory.

12. The information processing method according to claim 9, further comprising using file path information to access a subsequent data relating file,
wherein the first subsequent data descriptive information further includes, as metadata, the file path information for the subsequent data relating file.

13. The information processing method according to claim 9, further comprising displaying the display data on a display section,
wherein the first subsequent data descriptive information further includes title information of the first subsequent data.

14. The information processing method according to claim 9, further comprising displaying the display data on a display section,
wherein the first subsequent data descriptive information further includes date information including a date of acquiring or generating the first subsequent data.

15. The information processing method according to claim 9, further comprising displaying the display data on a display section,
wherein the first subsequent data descriptive information further includes a user identifier of a user who has acquired or generated the first subsequent data.

16. The information processing method according to claim 9, further comprising displaying the display data on a display section,
wherein the first subsequent data descriptive information further includes size information of the first subsequent data.

17. A non-transitory, computer-readable storage medium having one or more programs encoded thereon which, when executed by a computer, perform a method of managing subsequent data which is subsequently acquired or generated as data corresponding to a medium stored content in an information processing apparatus, the subsequent data comprising first subsequent data and second subsequent data, the method comprising:
recording first subsequent data descriptive information and first subsequent data management information corresponding to the first subsequent data, the first subsequent data descriptive information comprising type information of the first subsequent data, medium identification information, and title identification information, the first subsequent data management information being recorded in a manifest file, the recording occurring at a time of recording the first subsequent data in a storage section;
generating display data based on the first subsequent data descriptive information; and
reproducing or deleting the first subsequent data in response to user designation information for the display data,
wherein the reproducing or deleting comprises, in a case where the user designation information designates deletion of the first subsequent data and the manifest file comprises second subsequent data management information corresponding to the second subsequent data, obtaining an updated manifest file and recording the updated manifest file in the storage section.

18. The medium of claim 17, the method further comprising generating the first subsequent data descriptive information, the generating occurring at the time of recording the first subsequent data in the storage section.

19. The information processing apparatus according to claim 1, wherein the manifest file comprises virtual file system construction information corresponding to the subsequent data.

* * * * *